Dec. 16, 1924.
J. A. CLARKE, JR
1,519,238
MOTOR CONTROL SYSTEM
Filed June 25, 1921
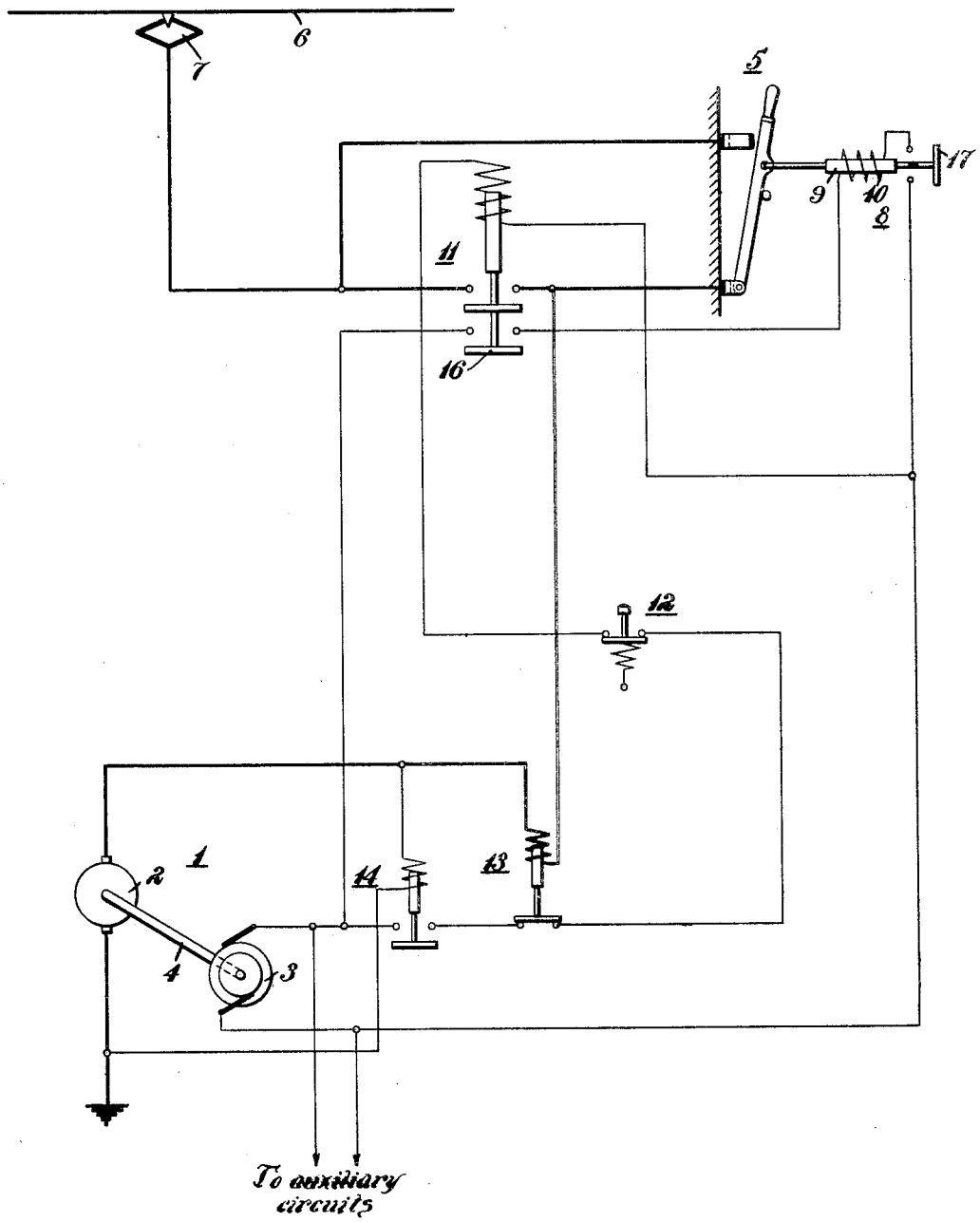
WITNESSES:
J.P.Wurmb
H.C.Lowe
INVENTOR
John A. Clarke Jr.
BY
Wesley G. Carr
ATTORNEY Patented Dec. 16, 1924.

1,519,238

UNITED STATES PATENT OFFICE.

JOHN A. CLARKE, JR., OF EDGEWOOD PARK, PENNSYLVANIA, ASSIGNOR TO WESTINGHOUSE ELECTRIC & MANUFACTURING COMPANY, A CORPORATION OF PENNSYLVANIA.

MOTOR-CONTROL SYSTEM.

Application filed June 25, 1921. Serial No. 480,311.

*To all whom it may concern:*

Be it known that I, JOHN A. CLARKE, Jr., a citizen of the United States, and a resident of Edgewood Park, in the county of Allegheny and State of Pennsylvania, have invented a new and useful Improvement in Motor-Control Systems, of which the following is a specification.

My invention relates to control systems and it has particular relation to control systems employed to govern the operation of railway motors that are subjected to comparatively high voltages.

One object of my invention is to provide a relatively simple control system for governing the operation of a motor-generator set, or dynamotor, that will prevent injury to an operator thereof by making it unnecessary for him to manually open any high-voltage circuits.

In railway operation, a motor-generator set, or the like, is usually employed to supply power to the locomotive auxiliary, such, for example, as the blower motors, compressor motors, lighting circuits and the field-magnet windings of the main motors during regeneration and, in some systems of control, during acceleration. It is obvious that, if no storage batteries are employed in such a control system, it is necessary to bring the motor-generator set up to full speed before starting any auxiliary devices or main motors of the locomotive.

As the motor of the motor-generator set operates at relatively high voltage, it is essential that it may be safely started and so protected that, in an emergency, it shall be automatically de-energized.

When a storage battery is employed in combination with a motor-generator set, it is a relatively simple matter to employ the electrical energy from the battery to operate the switch that connects the motor of the motor-generator set to a source of energy. On the other hand, when a storage battery is not employed, the motor-generator set, according to prior systems, must be energized by a switch that is closed by hand. However, it is undesirable that the operator be required to manually open this switch.

Briefly speaking, my invention consists in employing a manually operable auxiliary switch to start the motor of a motor-generator set, automatically connecting the motor-generator set to a source of energy by means of a contactor or circuit-breaker, and then automatically opening the first switch, provision being made for de-energizing the actuating coil of the contactor upon the occurrence of over-voltage or under-voltage conditions, or in accordance with the will of the operator.

For a better understanding of my invention, reference should be made to the accompanying drawing, the single figure of which shows a motor-generator set or dynamotor 1, which is preferably mounted upon a locomotive. The motor-generator set 1 comprises a motor 2 and a generator 3, which are mechanically connected together by means of a shaft 4.

The motor 2 may be energized upon the closure of a manually operated knife switch 5 by a circuit that extends from a source of electrical energy, such as a trolley wire 6, through a pantograph 7, knife-switch 5, the actuating coil of overload relay 13 and the motor 2 to ground. The knife-switch 5 is provided with an electro-magnetic device 8 for causing the switch 5 to assume its open position. The device 8 comprises a movable member or core 9 that may be actuated by a coil 10. The operation of the device 8 will be hereinafter more fully described.

A line switch or contactor 11 is provided for permanently connecting the motor 2 to the source of energy 6 after the switch 5 has closed. Upon the energization of the motor 2, it drives the generator 3, thereby providing electrical energy for the control circuits and auxiliary devices that are mounted upon the locomotive.

The line switch or contactor 11 is provided with an actuating coil which may be energized by a circuit extending from one terminal of the generator 3 through the actuating coil of the contactor 11, push-button device 12, overload relay 13 and no voltage relay 14 to the other terminal of the generator 3. The no-voltage relay 14 has its actuating coil connected across the terminals of the motor 2 to be energized by the counter-electromotive force thereof.

When the line switch or contactor 11 is closed, an auxiliary contactor or interlock 16 of a familiar type, which is mechanically connected therewith, is actuated to its closed position, thereby establishing a circuit from the generator 3 through the auxiliary contactor 17 of the knife-switch 5, actuating coil 10 of the knife-switch 5 and auxiliary contactor 16 to the generator 3.

Upon the energization of the actuating coil 10, the manually operable switch 5 is actuated to its open position, thereby causing the auxiliary contactor 17 to assume its open position to break the circuit comprising the actuating coil 10 of the switch 5.

The actuating coil of the contactor 11 will be de-energized upon the occurrence of overload or under-voltage conditions by means of the overload and no-voltage relays 13 and 14, respectively. The operator of the locomotive may de-energize the motor-generator set by pressing upon the push-button 12, causing it to assume its open position, thereby breaking the circuit comprising the actuating coil of the contactor 11 and thus opening the contactor.

From the above description, it is apparent that the operator is not required to be stationed in the immediate vicinity of any of the circuits that are subjected to relatively high voltage except to close the manually operable knife-switch 5 upon starting the motor-generator set and that, by means of my invention, he is not required to manually open any circuit of relatively high voltage.

While I have shown my invention in a preferred form, minor modifications may be made in the arrangement of circuits and the type of apparatus employed without departing from the spirit of my invention. I desire, therefore, to be limited only by the scope of the appended claims.

I claim as my invention:

1. In a control system, the combination with a translating device, of manually operable means for energizing said device and automatic means for maintaining said device energized and for rendering said first means inoperative for energizing said device.

2. In a control system, the combination with a translating device, of manually operable means for energizing said device, automatic means for maintaining said device energized and for rendering said first means electrically inoperative and automatic means for de-energizing said device upon the occurrence of a predetermined variation in voltage.

3. In a control system, the combination with a motor and a generator driven thereby, of a switch for energizing said motor, automatic means for maintaining said motor energized and means governed by said second means for opening said switch.

4. In a control system, the combination with a motor and a generator, of means comprising a switch for energizing said motor, an electrically operable switch for maintaining said motor energized and means governed by said electrically operable switch for opening said manually operable switch.

5. In a control system, the combination with a motor and a generator driven thereby, of means comprising a switch for starting said motor, means comprising a switch having an actuating coil for maintaining said motor energized and automatic means for opening said first switch upon the closure of said second switch.

6. In a control system, the combination with a motor and a generator driven thereby, of a source of electrical energy, a switch for energizing said motor, a contactor for connecting said motor to said source, means comprising an actuating coil for opening said switch and means actuated by said contactor for energizing said coil.

7. In a control system, the combination with a motor and a generator driven thereby, of a source of electrical energy, a manually operable switch for connecting said motor to said source, a contactor having an actuating coil for maintaining said motor energized, said coil being energized by said generator, and electrical means for actuating said manually operable switch after the closure of said contactor.

In testimony whereof, I have hereunto subscribed my name this 16th day of June 1921.

JOHN A. CLARKE, JR.